United States Patent
Mitchem et al.

(10) Patent No.: US 8,631,439 B2
(45) Date of Patent: Jan. 14, 2014

(54) METHODS, SYSTEMS, AND COMPUTER PROGRAM PRODUCTS FOR IMPLEMENTING A NAVIGATIONAL SEARCH STRUCTURE FOR MEDIA CONTENT

(75) Inventors: Matthew Mitchem, Decatur, GA (US); Randy Zimler, Gainesville, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 619 days.

(21) Appl. No.: 11/697,320

(22) Filed: Apr. 6, 2007

(65) Prior Publication Data

US 2008/0250358 A1 Oct. 9, 2008

(51) Int. Cl.
- G06F 3/00 (2006.01)
- G06F 13/00 (2006.01)
- H04N 5/445 (2011.01)

(52) U.S. Cl.
USPC .................. 725/52; 725/37; 725/38; 725/39; 725/40; 725/51; 725/53

(58) Field of Classification Search
USPC ...................................... 725/37–61; 715/700
See application file for complete search history.

(56) References Cited

U.S. PATENT DOCUMENTS

| | | | |
|---|---|---|---|
| 6,061,097 A | 5/2000 | Satterfield | |
| 6,177,931 B1 | 1/2001 | Alexander et al. | |
| 6,813,775 B1 | 11/2004 | Finseth et al. | |
| 6,820,277 B1 | 11/2004 | Eldering et al. | |
| 7,320,137 B1 * | 1/2008 | Novak et al. | 725/134 |
| 2001/0056578 A1 | 12/2001 | Hwang et al. | |
| 2002/0042914 A1 | 4/2002 | Walker et al. | |
| 2002/0073419 A1 | 6/2002 | Yen et al. | |
| 2003/0005448 A1 | 1/2003 | Axelsson et al. | |
| 2003/0066076 A1 | 4/2003 | Minahan | |
| 2003/0093790 A1 * | 5/2003 | Logan et al. | 725/38 |
| 2003/0110499 A1 | 6/2003 | Knudson et al. | |
| 2004/0093616 A1 * | 5/2004 | Johnson | 725/53 |
| 2004/0210936 A1 | 10/2004 | Rao et al. | |
| 2004/0216161 A1 * | 10/2004 | Barone et al. | 725/46 |
| 2004/0255322 A1 | 12/2004 | Meadows et al. | |
| 2005/0005308 A1 * | 1/2005 | Logan et al. | 725/135 |
| 2006/0217110 A1 | 9/2006 | Othmer | |
| 2007/0005569 A1 * | 1/2007 | Hurst-Hiller et al. | 707/3 |
| 2007/0157225 A1 | 7/2007 | Harada et al. | |
| 2007/0244902 A1 * | 10/2007 | Seide et al. | 707/10 |
| 2008/0168497 A1 | 7/2008 | Mitchem | |

OTHER PUBLICATIONS

U.S.P.T.O Correspondence Non-Final Office Action for U.S. Appl. No. 11/619,664 mailed Jul. 6, 2011.

* cited by examiner

Primary Examiner — Pankaj Kumar
Assistant Examiner — Alazar Tilahun
(74) Attorney, Agent, or Firm — Cantor Colburn LLP

(57) ABSTRACT

Methods, systems, and computer program products for navigating during playback of media content on a content viewing device are provided. A method includes associating a descriptor with a time element. The time element references an instantiation of the descriptor in a content file. The method also includes applying a reference tag that identifies the descriptor to a location on the navigational search structure associated with the content file. The location is determined by the time element. The method further includes displaying the reference tag on the navigational search structure at the content viewing device while viewing the content file in playback mode.

16 Claims, 5 Drawing Sheets

METHODS, SYSTEMS, AND COMPUTER PROGRAM PRODUCTS FOR IMPLEMENTING A NAVIGATIONAL SEARCH STRUCTURE FOR MEDIA CONTENT

CROSS REFERENCE TO RELATED APPLICATIONS

This application is related to commonly assigned U.S. patent application Ser. No. 11/619,664, entitled METHODS, SYSTEMS, AND COMPUTER PROGRAM PRODUCTS FOR PROVIDING INTERACTIVE ELECTRONIC PROGRAMMING GUIDE SERVICES, filed on Jan. 4, 2007. The above-referenced application is incorporated by reference herein in its entirety.

BACKGROUND

The present invention relates generally to media services, and more particularly, to methods, systems, and computer program products for implementing a navigational search structure for media content.

Delivering media content over a wide area data network is an increasingly popular method of transmitting audiovisual programs to viewers, enabling service providers to offer programming much more efficiently than in the case of traditional cable television systems.

Wide area data networks may be used to provide customers with broadcast television programs including those carried by over-the-air broadcast stations and cable TV channels. In addition, video-on-demand services are becoming popular with IP-based content delivery system customers. With the increasing popularity of these systems and the growing number of programming options available, navigating through the various content choices can become overwhelming. For example, users of Internet Protocol Television (IPTV) devices oftentimes need to sift through a vast number of content choices, such as electronic programming guides (EPGs) that list perhaps hundreds of channels (broadcast, premium, on-demand), locally stored content (e.g., programs stored locally on the IPTV device), video gaming options, etc.

What is needed, therefore, is a way to provide a user with navigational search options for a variety of types of programming content.

BRIEF SUMMARY

Exemplary embodiments include methods for navigating during playback of media content on a content viewing device. A method includes associating a descriptor with a time element. The time element references an instantiation of the descriptor in a content file. The method also includes applying a reference tag that identifies the descriptor to a location on the navigational search structure associated with the content file. The location is determined by the time element. The method further includes displaying the reference tag on the navigational search structure at the content viewing device when displaying the content file in playback mode.

Further exemplary embodiments include systems for navigating during playback of media content. A system includes a content viewing device and a processor executing on the content viewing device. The processor includes logic for implementing a method. The method includes associating a descriptor with a time element. The time element references an instantiation of the descriptor in a content file. The method also includes applying a reference tag that identifies the descriptor to a location on the navigational search structure associated with the content file. The location is determined by the time element. The method further includes displaying the reference tag on the navigational search structure at the content viewing device when displaying the content file in playback mode.

Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES.

The detailed description explains the exemplary embodiments, together with advantages and features, by way of example with reference to the drawings.

DETAILED DESCRIPTION OF EXEMPLARY EMBODIMENTS

In accordance with exemplary embodiments, navigational content search services are provided. The navigational content search services provide users with navigational search options for a variety of types of programming content. Features provided by the navigational content search services include providing and displaying reference tags identifying content items in response to scrolling along a navigational search structure during playback of a content file. In addition, the navigational content search services provide a means by which program viewers may search content files for one or more content items, whereby the navigational search structure displays results of the search using reference tags. Using an input mechanism and a user interface provided by the navigational content search services, a user may enter, or select from, indicia for a content file search whereby results of the search specify locations in the content file where the content items may be found, as well as a brief description of the content items. These, and other features of the navigational content search services, will now be described.

Figure 1:
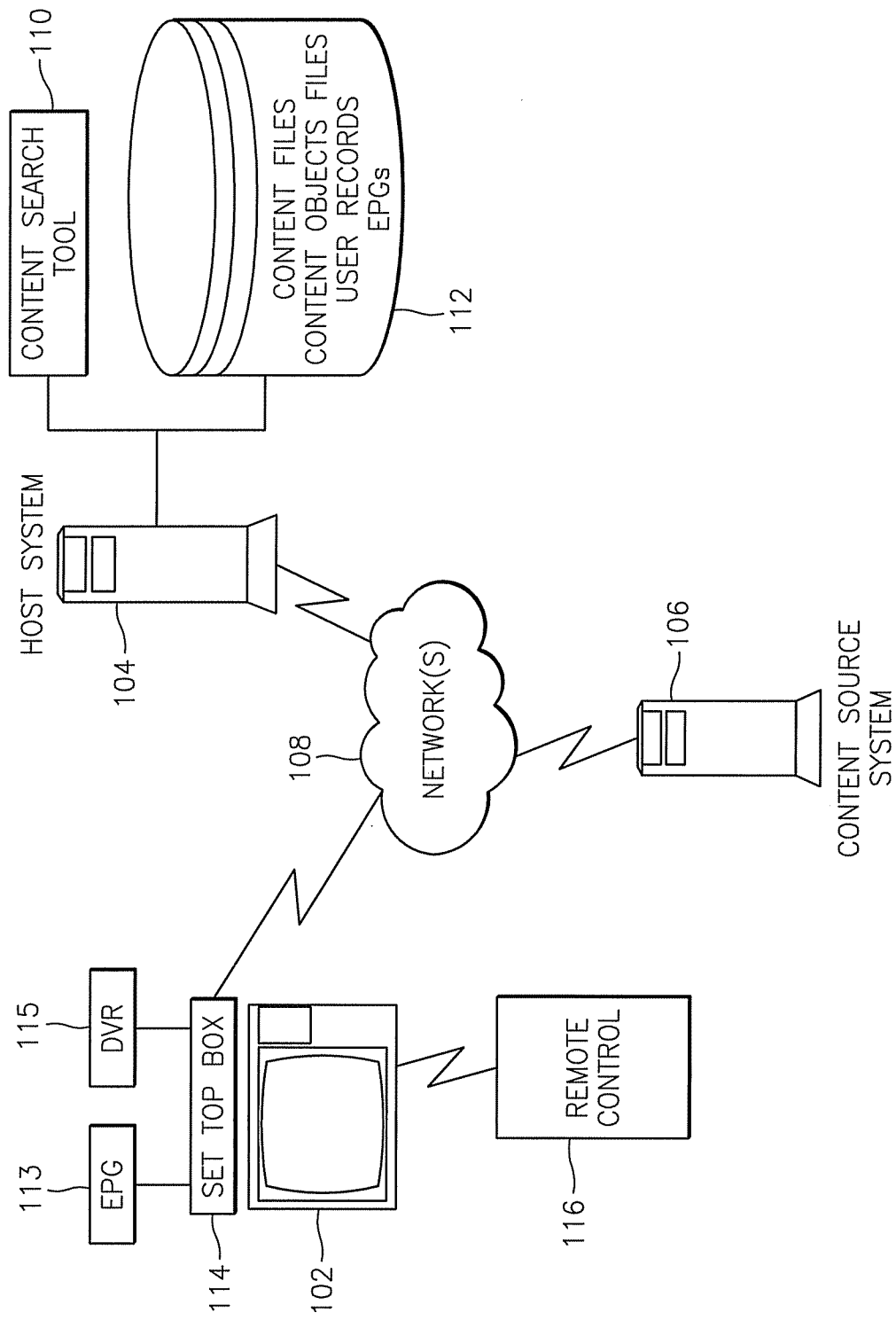
FIG. 1 is a block diagram depicting a system upon which navigational content search services may be implemented in accordance with exemplary embodiments.

Turning now to FIG. 1, a system upon which the navigational content search services may be implemented in accordance with exemplary embodiments will now be described. The system of FIG. 1 includes a content viewing device 102 and an addressable device (e.g., set top box (STB) 114) in communication with a host system 104 and content source system 106 via one or more networks 108. The content viewing device 102 may be an Internet Protocol-enabled television, or "IPTV." The content viewing device 102 uses addressable device 114 to provide services to a user/customer at a customer location. As known in the art, the addressable device, or STB 114, receives IPTV services such as broadcast video, broadcast audio, video-on-demand, etc. via an IP network (e.g., one or more networks 108). In alternate exemplary embodiments, the content viewing device 102 may be coupled to STB 114, wireless devices and/or computing devices to provide IPTV services. The STB 114 may be addressable by a device address such as a globally unique identifier (GUID), media access control (MAC) address, subscriber identity module (SIM) identifier, etc.

The content viewing device 102 receives program streams (also referred to herein as "content files") from the host system 104 via the STB 114 using a wireless or wireline link (e.g., an Ethernet link). The STB 114 is operatively coupled to the content viewing device 102 using a wireless or wireline link (e.g., coaxial cable carrying an RF-modulated signal). Alternatively or additionally, the STB 114 is coupled to the content viewing device 102 using a video connection such as S-Video or FireWire.

In exemplary embodiments, the STB 114 is equipped with a processing mechanism, such as a microprocessor or microcontroller and associated semiconductor memory, for executing an electronic program guide application (e.g., EPG 113). The electronic program guide application 113 causes the content viewing device 102 to display an electronic program guide in the form of a list or menu of one or more audiovisual programs available for viewing (e.g., a listing of one or more channels in addition to a listing of programs that are available for viewing on demand, wherein the one or more channels offer audiovisual programs associated with one or more corresponding scheduled broadcast times). The STB 114 includes a channel/program selection mechanism capable of accepting a viewer input identifying one or more audiovisual programs for viewing on demand. This channel/program selection mechanism may operate in conjunction with the electronic program guide application 113, for example using an optional remote control 116 or a touch-sensitive screen on the content viewing device 102 to select a displayed audiovisual program or channel from the displayed electronic program guide. Alternatively or additionally, the STB 114 may include a channel/program selection mechanism such as a rotary switch and/or a channel/program selection mechanism operated using an optional remote control 116. The STB 114 may include circuitry for converting digital packets representing program streams received into analog or digital signals capable of being displayed on the content viewing device 102.

While the content viewing device 102 is described above with respect to an IPTV device, it will be understood that the exemplary embodiments are not so limited. For example, in alternate exemplary embodiments, the content viewing device 102 may be a television, personal computer, wireless mobile computing device, or other suitable IP-enabled device, whereby, e.g., the functionality described above with respect to the STB 114 is incorporated into the content viewing device 102 (e.g., where the content viewing device 102 includes a processor executing logic on the device 102 for implementing the navigational content search services described herein).

Networks 108 may include a local area network (LAN) associated with the content viewing device 102, whereby the STB 114 is coupled to the LAN at the customer location and then to a communication device, such as a DSL modem (not shown). The STB 114 may also include a digital video recorder (DVR) 115 or may be coupled to a DVR for storing information and content as described herein.

In exemplary embodiments, the networks 108 may include various video serving offices (VSOs) in communication via Ethernet aggregation routers (EARs). The VSOs, in turn, may interface with a video head end office (VHO) through a broadband aggregation router (BAR). The VHO may interface with the BAR through a head end router (IHR), which communicates with multiple systems for distributing content, e.g., the host system 104 and/or content source system 106. One content source system may be a video-on-demand unit for providing content upon request by a client device (e.g., a STB 114). Other content source systems may include a media distribution system which may deliver broadcast content on a national or regional basis. A media acquisition system receives content from an encoder that formats content from a content aggregator. It is understood that the networks 108, the content viewing device 102, the host system 104, and the content source system 106 may be interconnected using a variety of network technologies including wired and wireless technologies such as LAN, WAN, Internet, ATM, PSTN, Ethernet, 802.11, etc.

The system depicted in FIG. 1 is intended to be exemplary in nature as a variety of implementations are possible without departing from the scope of the invention. In exemplary embodiments, IPTV services may be provided using a software platform such as the Microsoft® TV IPTV Edition™ running on network elements in the networks 108.

In exemplary embodiments, the host system 104 executes an application, referred to herein as a content search tool 110, to perform the navigational content search services described herein. The content search tool 110 may be implemented by software and/or hardware components. The STB 114 may include a programming interface for communicating with the content search tool 110 (e.g., via functions provided on the STB 114 or remote control 116). In addition, the STB 114 may contain user interfaces for initiating the navigational content search services. The user interfaces may be implemented by interface screens, audio technology, voice recognition technology, or any other technology to allow a user to communicate with the STB 114 to initiate the services. In exemplary embodiments, the processing described herein may be shared by the STB 114 and the host system 104 (e.g., by providing an applet to the STB 114) or contained completely within the STB 114.

The networks 108 may be any type of known networks including, but not limited to, a wide area network (WAN), a local area network (LAN), a global network (e.g. Internet), a virtual private network (VPN), and an intranet. The networks 108 may be implemented using a wireless network or any kind of physical network implementation.

In exemplary embodiments, a storage device 112 is in communication with host system 104. The storage device 112 may be implemented using a variety of devices for storing electronic information. It is understood that the storage device 112 may be implemented using memory contained in the host system 104 or the STB 114 or it may be a separate physical device. The storage device 112 may be logically addressable as a consolidated data source across a distributed environment that includes the networks 108. Information stored in the storage device 112 may be retrieved and manipulated via the host system 104. The storage device 112 may include data such as content files, content objects files, user records, and EPGs. The storage device 112 may also include other kinds of data such as administrative information utilized by the content search tool 110. In exemplary embodiments, the host system 104 operates as a database server and coordinates access to application data including data stored on the storage device 112.

As indicated above, the content files in the storage device 112 represent programming content (e.g., broadcast programs, on-demand programs, etc.). In addition, content files may be stored locally in memory on the content viewing device 102 (e.g., programming recorded via the DVR 115. With respect to content files stored in the storage device 112, the host system 104 generates a sequence of packets representing the content files in a digital format compatible with Internet protocol (IP) networking. For example, the host system 104 generates a program stream in the form of an audiovisual signal. The program stream may be a multi-cast or unicast program stream.

This sequence of packets may be compressed or processed to eliminate redundant information, thereby reducing the bandwidth occupied by one or more of program streams. For example, IPTV digital video transmission methods currently employ standards developed by the Motion Pictures Expert Group (MPEG) for program stream formatting and network transport. These standards, known collectively as MPEG, define approaches for compressing video content to significantly reduce the bandwidth required for network transport. MPEG compression creates a stream of individual packets or frames, each carrying video content. Illustratively, the sequence of packets represented by the audiovisual signal is in a packetized format that complies with MPEG-4 standard H.264.

The digital video transmission methods may also employ MPEG 7 standards that provide a formal system for describing multimedia content and use XML for storing metadata used in describing the multimedia content.

The host system 104 depicted in FIG. 1 may be implemented using one or more servers operating in response to a computer program stored in a storage medium accessible by the server. The host system 104 may operate as a network server (e.g., a web server) to communicate with the STB 114. The host system 104 handles sending and receiving information to and from the STB 114 and can perform associated tasks. In exemplary embodiments, the host system 104 also includes a firewall to prevent unauthorized access to the host system 104 and enforce any limitations on authorized access. For instance, an administrator may have access to the entire system and have authority to modify portions of the system. A firewall may be implemented using conventional hardware and/or software.

The host system 104 may also operate as an application server. The processor in the host system 104 executes one or more computer programs to implement the navigational content search services (e.g., the content search tool 110). As previously described, it is understood that separate servers may be utilized to implement the network server functions and the application server functions. Alternatively, the network server, the firewall, and the application server may be implemented by a single server executing computer programs to perform the requisite functions.

Features provided by the navigational content search services include, among others, a means by which program viewers may search content files for one or more content items. These content items may reflect any type of indicia, e.g., names, locations, events, abstract concepts, and relationships among these indicia. The search services include a navigational search structure provided via the content search tool 110 for display on a user device (e.g., content viewing device 102). Using an input mechanism (e.g., remote control 116 or options on the STB 114), and a user interface provided by the content search tool 110, a user may enter, or select from, indicia for a content file search whereby results of the search specify locations in the content file where the content items may be found, as well as a brief description of the content items.

Figure 3:
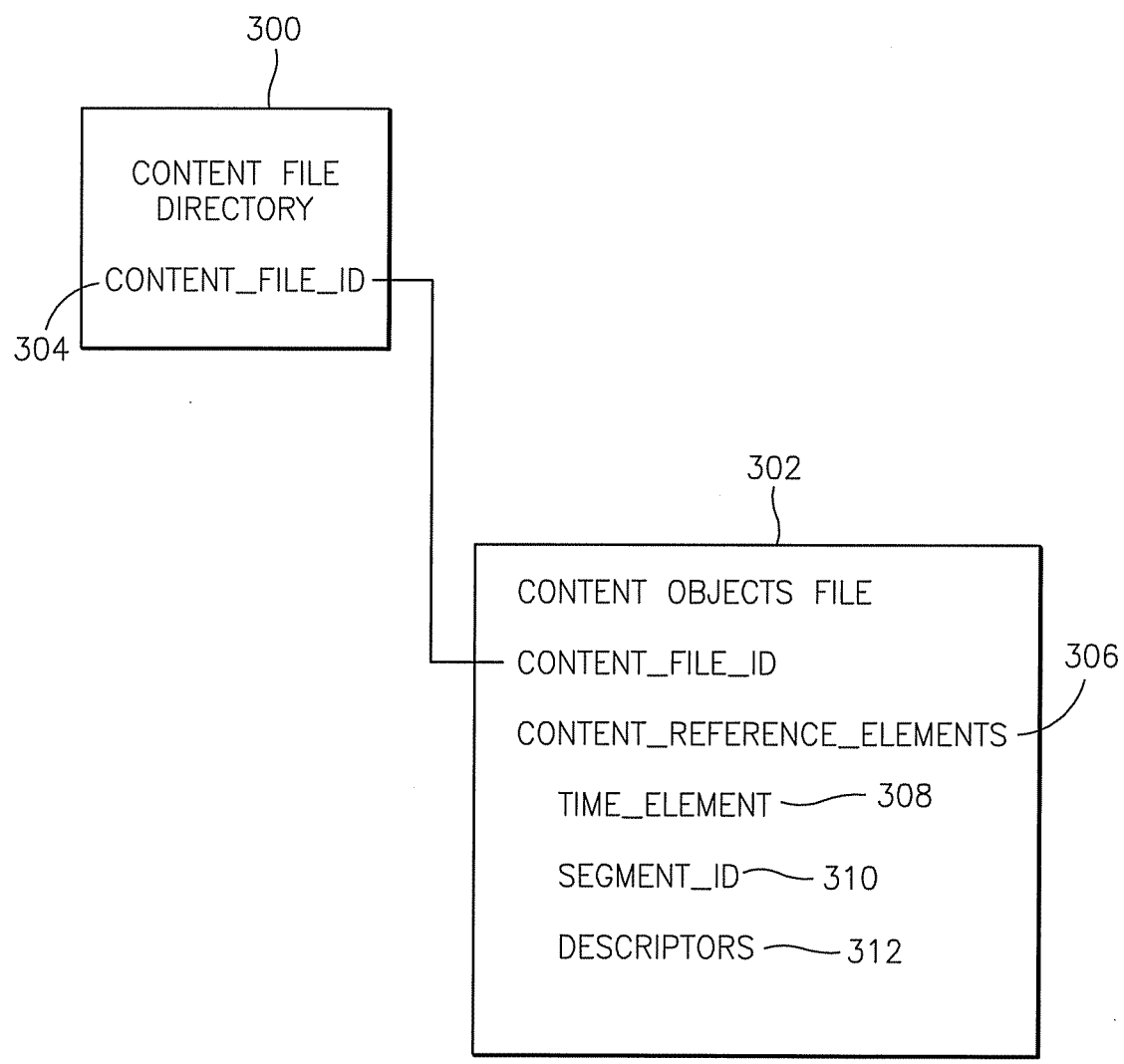
FIG. 3 is a sample content file directory linked to a content objects file used in implementing the navigational content search services in exemplary embodiments.

The indicia may be implemented as metadata captured from the content file using a variety of techniques. For example, MPEG 7 uses metadata and standardized data constructs that enable the description of audiovisual data content in multimedia environments. Alternatively, or in addition thereto, the indicia may be implemented by filtering existing data provided with content files (e.g., closed captioning data) and applying data analysis to the closed captioning data. The data analysis classifies the content elements or indicia in the content file. The indicia may be included within the program stream or may be separately acquired and managed data. If the indicia are separately maintained, they may be stored separately from the content files (e.g., content files in the storage device 112 and/or STB 114). As shown in FIG. 3, the indicia is stored separately from the content files in content objects files for ease of illustration.

Each of the content object files may be linked to a corresponding content file via a key (e.g., content file identifier that links the content file to its associated content objects file) as shown generally in FIG. 3. The content file may include a unique identifier (e.g., CONTENT_FILE_ID) 304 that is stored in a content file directory 300 in storage device 112. The content file directory may include a listing of all content files managed by the content search tool 110. The content objects file 302 stores various items (also referred to as "objects") for referencing or describing content elements found in the content file. For example CONTENT_REFERENCE_ELEMENTS 306 may include a time element (TIME_ELEMENT) 308, a segment identifier (SEGMENT_ID) 310, and content descriptors (DESCRIPTORS) 312. The time element 308 may be a timestamp corresponding to an instantiation of a descriptor within a content file. The segment identifier 310 may be used to identify particular segments or portions of a content file using some classification technique, e.g., indexing. The content descriptors 312 include terms that characterize a content element (e.g., a name characterizes a person).

The content search tool 110 utilizes the content file directory 300 and corresponding content objects file 302 to search and retrieve search items provided by a content viewing device 102 user via the user interface component of the content search tool 110. The content search tool 110 populates a navigational search structure with results of searches conducted by the user as described further herein.

Figure 2:
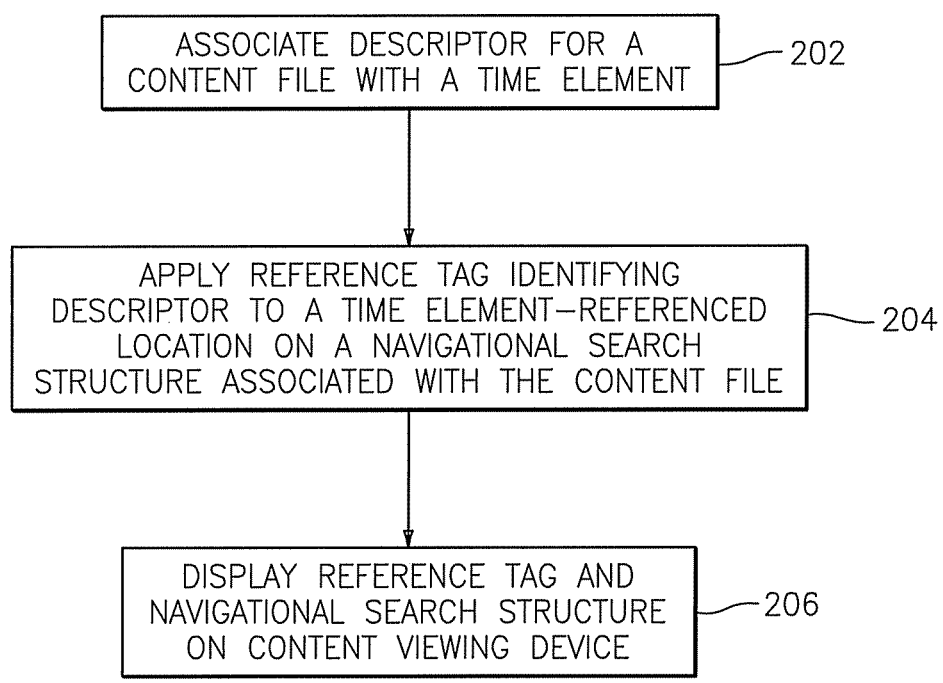
FIG. 2 is a flow diagram describing a process for implementing the navigational content search services in exemplary embodiments.

Tuning now to FIG. 2, a process for implementing the navigational content search services will now be described in accordance with exemplary embodiments. It is assumed in FIG. 2, that a user has entered a descriptor for a content file. At step 202, the descriptor is associated with a time element. The time element corresponds to a location in the content file in which the descriptor is found. One or more time elements may be identified for a given descriptor. For example, if the descriptor includes a location which is found in multiple locations within a content file, the descriptor may be associated with multiple time elements. The time element for each descriptor may be stored and cross-referenced via the content objects file 302.

The time element may be implemented as a starting point reference, e.g., a timestamp, associated with a frame in the content file where the descriptor is found. The time element may alternatively be implemented as a time range (e.g., starting time and duration of instantiation of the descriptor in the content file, such as where the descriptor is found in multiple, consecutive frames). The content search tool 110 provides a navigational search structure that employs a timing mechanism for tracking content frames within the content file. The navigational search structure may be represented, e.g., as a bar shaped element, the length of which corresponds to a length or time duration of the content file. A sample display screen and user interface options (including the navigation search structure) are shown generally in FIG. 4.

Figure 4:
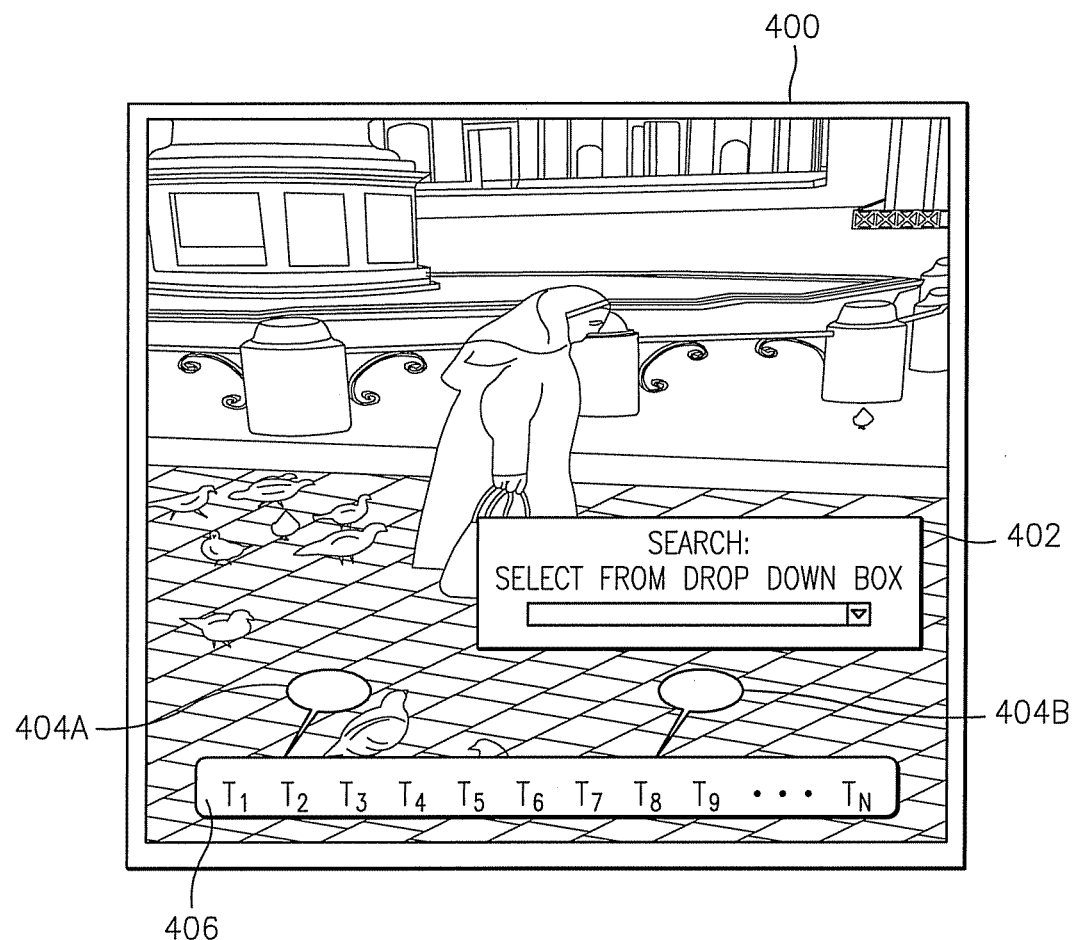
FIG. 4 is a display screen and user interface options provided by the navigational content search services in exemplary embodiments.

At step 204, a reference tag identifying the descriptor is applied to a time element-referenced location on a navigational search structure associated with the content file. As shown in FIG. 4, a display screen 400 of content viewing device 102 displays a content file along with user interface elements provided by the content search tool 110. These user interface elements include a search option represented as a search box 402. A user at content viewing device 102 may search for content items in the content file that may, or may not, be presented on the display screen 400. As shown in FIG. 4, the user enters a search term via a drop down feature in the search box 402. It will be understood that various other search functions may be employed, e.g., free-form text searching in order to realize the advantages of the embodiments described herein.

Once the term is entered in search box 402, the content search tool 110 searches a content objects file in storage device 112 for a match. If found, a reference tag is associated with the corresponding descriptor in the content objects file and the associated time element in the content objects file is used to apply the reference tag to the navigational search structure 406. As shown in FIG. 4, two reference tags 404A and 404B are displayed on the navigational search structure. Reference tags 404A and 404B are represented as pop-up balloons on the navigational search structure 406; however, it will be understood that any type of reference tag, e.g., using HTML, may be used in creating a reference to the content item on the structure 406.

As shown in FIG. 4, the reference tag (e.g., 404A and 404B) and the navigational search structure 406 are displayed on the content viewing device 102. The reference tag may be automatically populated on the search structure 406 as a result of the search, or may be populated during the time the user navigates the search structure 406 (e.g., using features provided on remote control 116 or other input mechanism). In addition, the navigational search structure 406 may be implemented using a toggle feature provided on the remote control 116 whereby a program status bar is replaced by the navigational search structure 406 when the user activates the toggle feature.

The user may navigate the search structure 406 whereby the reference tags display information regarding the content items searched independent of the underlying content in the content file. For example, the reference tags may provide descriptive information regarding the content item and/or relationships between the content item and other content items in the program without retrieving and presenting the underlying content. If the user desires, the navigational search tool 110 may include an option whereby the user selects the reference tag and the referenced content appears on the display screen 400.

Figure 5:
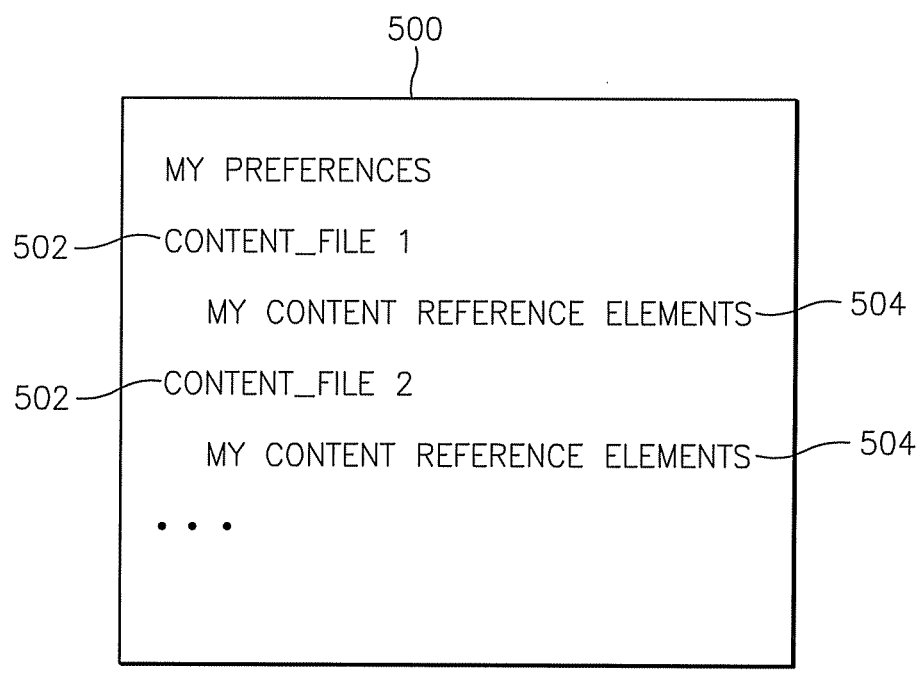
FIG. 5 is a sample user record and preference selections used in implementing the navigational content search services in exemplary embodiments.

In addition to providing search capabilities, the content search tool 110 also enables a user to create and store content reference elements (e.g., descriptors) in a record for later retrieval and use. For example, a search result that yields two reference tags for a particular content file may be saved, such that the user can later access the underlying content referenced in the tag. A sample user record 500 including preference selections 504 for corresponding content files 502 is shown generally in FIG. 5.

In addition, the feature may include a communication element whereby the user saves a search result and transmits the result to another content viewing device (e.g., where the content devices employ a communications or messaging function).

Thus, as should be understood from the above-described embodiments, for example, a user may be able to search a recorded football game for the reference tag "touchdown" (which may be generated as part of the program content or automatically via a close captioning process) so that the user may be directed to particular portions of the recorded program that involve a description of a touchdown being scored. Other embodiments of the invention allow the user to store keywords associated with portions of a program for later retrieval. For example, the user may desire to tag a portion of a program because the scene includes a favorite actor of theirs. In other embodiments, the content provider may also provide these tags. In other embodiments, the user may desire to search all of their stored content for scenes involving their favorite actor and may then jump immediately to each of those scenes without having to navigate through the hours of content on their storage device. This is only one of many examples of relevant uses for the above-described embodiments.

As described above, the exemplary embodiments can be in the form of computer-implemented processes and apparatuses for practicing those processes. The exemplary embodiments can also be in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the exemplary embodiments. The exemplary embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. For example, although described above in an IPTV environment, the invention may also be applied to other environment outside of IPTV. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A method, comprising:

associating a descriptor with time elements, each of the time elements referencing a separate and corresponding instantiation of a content item within a content file, the content item indicative of a media representation of the descriptor, and the content file comprising a program, wherein the descriptor characterizes the content item in the content file, the descriptor specifying a relationship between two descriptors;

storing the descriptor and the time elements in a database;

providing a search window on a display screen of a content viewing device, the search window overlaying a presentation of the content file;

receiving the descriptor from a user at the content viewing device, the descriptor being a text string received via the search window;

retrieving, from the database, the descriptor and the time elements;

applying a reference tag that identifies the descriptor from the user to locations on a navigational search structure associated with the content file, the locations determined by corresponding time elements;

displaying only the reference tag corresponding to the descriptor from the user on the navigational search structure at the content viewing device;

searching for content during playback of the content file based upon matching a search term with a term identified in the reference tag; and storing results of the searching, and communicating the results to another content viewing device;

wherein the descriptor is identified in the content file via filtering a closed captioning file associated with the content file and the descriptor is classified using an indexing scheme.

2. The method of claim 1, wherein the program includes a broadcast program.

3. The method of claim 1, wherein the navigational search structure includes a timing mechanism, the method further comprising:

tracking content frames within the content file; and associating reference tags with a time interval of the content file.

4. The method of claim 1, wherein the navigational search structure includes a timing mechanism, the method further comprising:

tracking content frames within the content file; and associating reference tags with a portion of the content file.

5. The method of claim 1, wherein the navigational search structure is represented as a bar shape, the bar shape having a length corresponding to a duration of the content file.

6. A system, comprising:

a content viewing device; and a processor executing on the content viewing device, the processor including logic for implementing a method, comprising:

associating a descriptor with time elements, each the time elements referencing a separate and corresponding instantiation of a content item within a content file, the content item indicative of a media representation of the descriptor, and the content file comprising a program, wherein the descriptor characterizes the content item in the content file, the descriptor specifying a relationship between two descriptors;

storing the descriptor and the time elements in a database;

providing a search window on a display screen of a content viewing device, the search window overlaying a presentation of the content file;

receiving the descriptor from a user at the content viewing device, the descriptor being a text string received via the search window;

retrieving, from the database, the descriptor and the time elements;

applying a reference tag that identifies the descriptor from the user to locations on a navigational search structure associated with the content file, the locations determined by corresponding time elements;

displaying only the reference tag corresponding to the descriptor from the user on the navigational search structure at the content viewing device;

searching for content during playback of the content file based upon matching a search term with a term identified in the reference tag; and storing results of the searching, and communicating the results to another content viewing device;

wherein the descriptor is identified in the content file via filtering a closed captioning file associated with the content file and the descriptor is classified using an indexing scheme.

7. The method of claim 1, further comprising:

displaying a brief description of the content item in response to selection of the reference tag on the navigational search structure by the user, the brief description displayed absent any display of the content file;

wherein associating the descriptor with the time elements includes associating the descriptor with a brief description of the content item.

8. The system of claim 6, wherein the program includes a video-on-demand program.

9. The system of claim 6, wherein the navigational search structure includes a timing mechanism, the method further comprising:

tracking content frames within the content file; and associating reference tags with a time interval of the content file.

10. The system of claim 6, wherein the navigational search structure includes a timing mechanism, the processor further including logic for implementing:

tracking content frames within the content file; and associating reference tags with a portion of the content file.

11. The system of claim 6, wherein the navigational search structure is represented as a bar shape, the bar shape having a length corresponding to a duration of the content file.

12. A computer program product comprising a non-transitory storage medium storing instructions, which when executed by a computer implement a method, comprising:

associating a descriptor with time elements, each of the time elements referencing a separate and corresponding instantiation of a content item descriptor within a content file, the content item indicative of a media representation of the descriptor, and the content file comprising a program, wherein the descriptor characterizes the content item in the content file, the descriptor specifying a relationship between two descriptors;

storing the descriptor and the time elements in a database;

providing a search window on a display screen of a content viewing device, the search window overlaying a presentation of the content file;

receiving the descriptor from a user at the content viewing device, the descriptor being a text string received via the search window;

retrieving, from the database, the descriptor and the time elements;

applying a reference tag that identifies the descriptor from the user to locations on a navigational search structure associated with the content file, the locations determined by corresponding time elements;

displaying only the reference tag corresponding to the descriptor from the user on the navigational search structure at the content viewing device;

searching for content during playback of the content file based upon matching a search term with a term identified in the reference tag; and storing results of the searching, and communicating the results to another content viewing device;

wherein the descriptor is identified in the content file via filtering a closed captioning file associated with the content file and the descriptor is classified using an indexing scheme.

13. The computer program product of claim 12, wherein the program includes a locally stored program.

14. The computer program product of claim 12, wherein the navigational search structure includes a timing mechanism, the method further comprising:
tracking content frames within the content file; and
associating reference tags with a time interval of the content file.

15. The computer program product of claim 12, wherein the navigational search structure includes a timing mechanism, the method further comprising:
tracking content frames within the content file; and
associating reference tags with a portion of the content file.

16. The computer program product of claim 12, wherein the navigational search structure is represented as a bar shape, the bar shape having a length corresponding to a duration of the content file.

* * * * *